(12) United States Patent
Jezierski, Jr.

(10) Patent No.: US 12,003,098 B2
(45) Date of Patent: Jun. 4, 2024

(54) SYSTEMS AND METHODS FOR A MODULAR SCALABLE ARCHITECTURE FOR ENERGY STORAGE AUXILIARY POWER AND FUNCTIONS

(71) Applicant: GE Grid GmbH, Frankfurt am Main (DE)

(72) Inventor: Chester Stanley Jezierski, Jr., Amsterdam, NY (US)

(73) Assignee: GE Grid GmbH, Frankfurt Am Main (DE)

( * ) Notice: Subject to any disclaimer, the term of this patent is extended or adjusted under 35 U.S.C. 154(b) by 188 days.

(21) Appl. No.: 17/450,338

(22) Filed: Oct. 8, 2021

(65) Prior Publication Data

US 2023/0110853 A1    Apr. 13, 2023

(51) Int. Cl.
*H02J 1/10* (2006.01)
*H02J 3/38* (2006.01)
*H02J 7/00* (2006.01)

(52) U.S. Cl.
CPC .............. *H02J 1/106* (2020.01); *H02J 3/381* (2013.01); *H02J 7/0024* (2013.01); *H02J 7/0063* (2013.01)

(58) Field of Classification Search
CPC .......... H02J 1/106; H02J 3/381; H02J 7/0024; H02J 7/0063
USPC .......................................................... 307/46
See application file for complete search history.

(56) References Cited

U.S. PATENT DOCUMENTS

| | | | |
|---|---|---|---|
| 11,399,065 B1 * | 7/2022 | Thirumurthy | ..... H02J 13/00004 |
| 2011/0140527 A1 | 6/2011 | Choi | |
| 2011/0148213 A1 | 6/2011 | Baldwin et al. | |
| 2012/0126623 A1 | 5/2012 | Koehl | |
| 2016/0043555 A1 | 2/2016 | Howell | |
| 2016/0266639 A1 * | 9/2016 | Doering | ..................... G06F 1/26 |
| 2018/0287388 A1 * | 10/2018 | Bates | ...................... H02J 3/003 |

FOREIGN PATENT DOCUMENTS

| | | | |
|---|---|---|---|
| CA | 3098332 | * | 5/2022 |
| EP | 0575101 | A2 | 12/1993 |
| EP | 2887484 | A1 | 6/2015 |
| WO | 2021083118 | A1 | 5/2021 |

OTHER PUBLICATIONS

International Search Report and Written Opinion from International Application No. PCT/US2022/077533, dated Jan. 31, 2023; 16 pgs.

* cited by examiner

*Primary Examiner* — Richard Tan (74) *Attorney, Agent, or Firm* — Armstrong Teasdale LLP (57) ABSTRACT

An auxiliary power system is provided. The auxiliary power system includes a back plane including one or more power inputs and a plurality of mating provisions. The back plane is configured to receive a first electrical power at the one or more power input and output the first electrical power through the plurality of mating provisions. The auxiliary power system further includes a plurality of power modules, each electrically coupled and mechanically coupled to the back plane at one of the plurality of mating provisions and configured to convert the first electrical power to a second electrical power. The auxiliary power system further includes a plurality of auxiliary devices each respectively electrically coupled to at least one power module of the plurality of power modules and configured to receive the second electrical power from the at least one power module.

18 Claims, 5 Drawing Sheets

SYSTEMS AND METHODS FOR A MODULAR SCALABLE ARCHITECTURE FOR ENERGY STORAGE AUXILIARY POWER AND FUNCTIONS

BACKGROUND

The field of the invention relates generally to auxiliary power distribution systems, and more particularly, to auxiliary power distribution systems for a battery energy storage system.

Energy storage systems, such as battery energy storage systems, generally include various electrical components, or "auxiliary components," that facilitate operation of the energy storage system. These systems may include, for example, heating ventilating and air conditioning (HVAC), battery controls and switchgear, instrumentation, lighting, cooling fans, circuit breakers, emergency stops, uninterruptible power supplies (UPS), fire suppression systems, or other components related to control and/or safe operation of the energy storage system. Each of these components requires electrical power, and each component may have respective requirements for power, for example, one of alternating current (AC) or direct current (DC), a certain capacity for power or current, and/or a certain voltage or frequency.

Because each energy storage system may require different auxiliary components, a custom auxiliary power distribution system generally must be designed for each energy storage system to meet these specific power requirements. This increases the time and cost required for designing, building, and maintaining such auxiliary power distribution systems. A modular auxiliary power distribution system that can be configured to provide power for a variety of different auxiliary power system designs is therefore desirable.

BRIEF DESCRIPTION

In one aspect, an auxiliary power system is provided. The auxiliary power system includes a back plane including one or more power inputs and a plurality of mating provisions. The back plane is configured to receive a first electrical power at the one or more power inputs and output the first electrical power through the plurality of mating provisions. The auxiliary power system further includes a plurality of power modules. Each power module of the plurality of power modules is electrically coupled to and mechanically coupled to the back plane at one of the plurality of mating provisions. Each power module of the plurality of power modules is configured to convert the first electrical power to a second electrical power. The auxiliary power system further includes a plurality of auxiliary devices. Each auxiliary device of the plurality of auxiliary devices is respectively electrically coupled to at least one power module of the plurality of power modules and is configured to receive the second electrical power from the at least one power module.

In another aspect, a method for assembling an auxiliary power system is provided. The method includes electrically and mechanically coupling, to a back plane including one or more power inputs and a plurality of mating provisions, a plurality of power modules each to at least one of the plurality of mating provisions. The back plane is configured to receive a first electrical power at the one or more power inputs and to output the first electrical power though the plurality of mating provisions. Each power module of the plurality of power modules is configured to convert the first electrical power to a second electrical power. The method further includes respectively electrically coupling a plurality of auxiliary devices to at least one power module of the plurality of power modules. Each auxiliary device of the plurality of auxiliary devices is configured to receive the second electrical power from the at least one power module.

In another aspect, an auxiliary power distribution system is provided. The auxiliary power distribution system includes a back plane including one or more power inputs and a plurality of mating provisions. The back plane is configured to receive a first electrical power at the one or more power inputs and output the first electrical power through the plurality of mating provisions. The auxiliary power distribution system further includes a plurality of power modules. Each power module of the plurality of power modules is electrically coupled to and mechanically coupled to the back plane at one of the plurality of mating provisions. Each power module of the plurality of power modules is configured to convert the first electrical power to a second electrical power. A plurality of auxiliary devices are respectively electrically coupled to at least one power module of the plurality of power modules and are configured to receive the second electrical power from the at least one power module.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

In the following specification and the claims, reference will be made to a number of terms, which shall be defined to have the following meanings.

The singular forms "a", "an", and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," is not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The embodiments described herein include an auxiliary power system for a battery energy storage system. The auxiliary power system has modular components, enabling the auxiliary power system to be scaled and configured to accommodate the requirements of various different battery energy storage systems or other systems requiring power for auxiliary components. The auxiliary power system includes a back plane that includes one or more power inputs and a plurality of mating provisions, which, as described below, enable various different modular components to be coupled to the back plane. The back plane is configured to receive a first electrical power (such as mains power) at the power input and output the first electrical power through the mating provisions. The back plane may also receive additional electrical power, such as from a site UPS, a diesel generator, or other external power sources at the power input, and may output the second electrical power through the mating provisions.

The auxiliary power system further includes a plurality of power modules. Each of the power modules is electrically coupled and mechanically coupled to the back plane at one of the mating provisions. Each power module of the plurality of power modules is configured to convert the first electrical power to a second electrical power. The auxiliary power system further includes a plurality of auxiliary devices. Each of the auxiliary power devices is respectively electrically coupled and mechanically coupled to at least one of the power modules and is configured to receive the second electrical power from the at least one power module.

Each mating provision and power module may be configured to transfer a certain amount of power. Accordingly, depending on the power requirements of a certain auxiliary device, the auxiliary device may be coupled to multiple power modules, or be coupled to a larger power module that connects to multiple mating provisions of the back plane. For example, an auxiliary component with a relatively high power demand, such as an HVAC system or battery switchgear system, may be connected to the backplane via multiple mating provisions though one or more power modules.

In certain embodiments, in addition to the power modules, additional modules (sometimes referred to herein as "option modules") may be coupled to the mating provisions to receive power from the back plane. These option modules include auxiliary components (sometimes referred to herein as "option components") that are incorporated into the option modules. Additionally, the back plane may include power output provisions in addition to the mating provisions that may be coupled directly to certain auxiliary components. The power modules and option modules may include AC-to-DC power supplies, DC-to-DC converters, DC-to-AC inverters, or AC-to-AC transformers.

Figure 1:
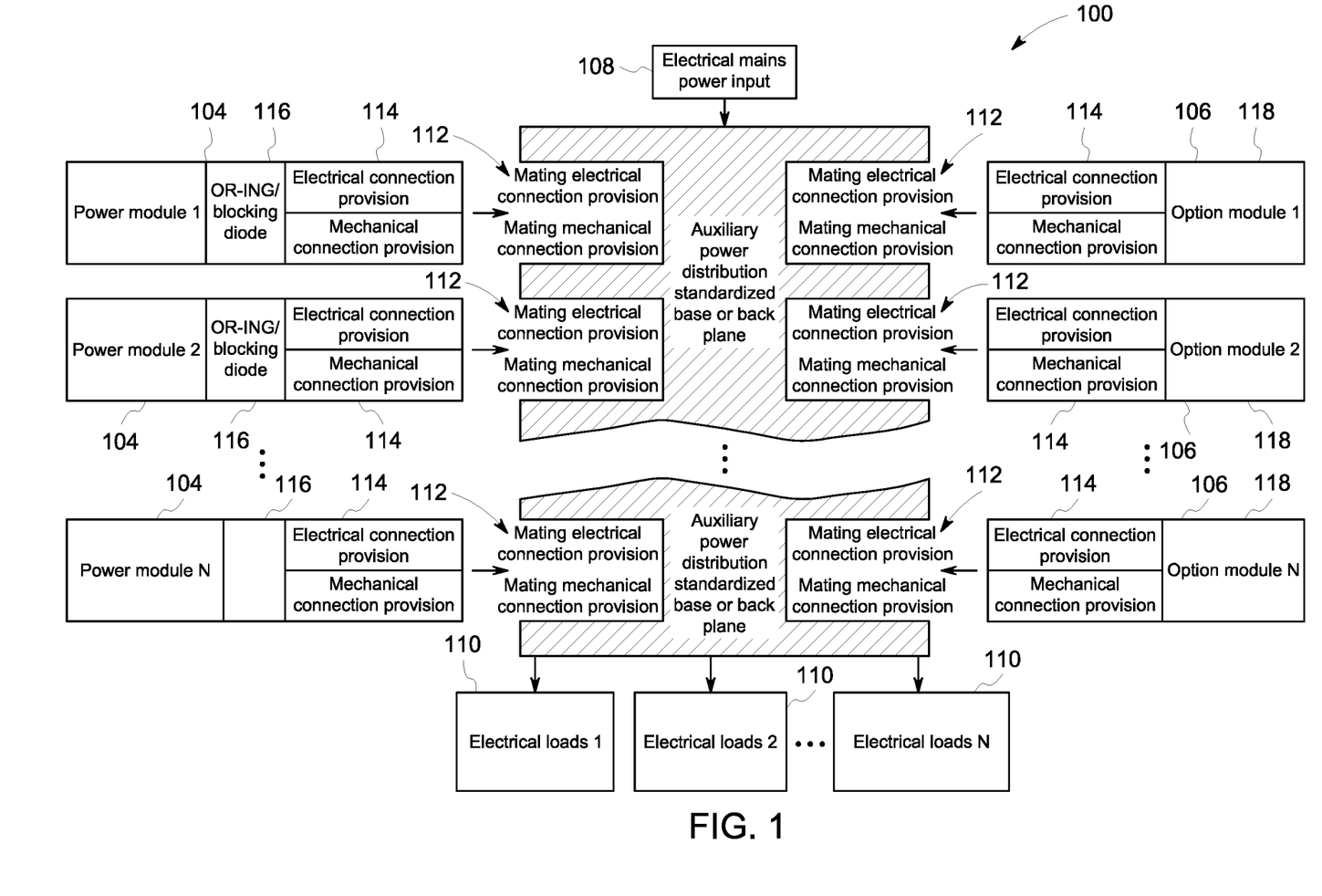
FIG. 1 is a block diagram of an example auxiliary power distribution system.

FIG. 1 is a block diagram illustrating an example auxiliary power distribution system 100. Auxiliary power distribution system 100 includes a back plane 102, a plurality of power modules 104, and a plurality of option modules 106, through which power may be provided to auxiliary components of a system such as a battery energy storage system.

Back plane 102 includes one or more input connections 108, a plurality of output connections 110, and a plurality of mating provisions 112. Back plane 102 is configured to receive power via input connection 108 from one or more power sources such as mains (i.e., line) power, site UPS power, or diesel generator power. In some embodiments, the input power source may provide 480 volt 60 hertz AC three-phase power, 400 volt 50 hertz AC three-phase power, or another type of power. In some embodiments, back plane 102 is configured to convert the input power to at least one other type of power, which may be provided to components of the battery energy storage system. Back plane 102 is configured to output at least some of this converted power via output connections 110. For example, as shown in FIG. 1, back plane 102 may provide power to electrical loads such as 24 volt DC power to battery switchgear, controls, instrumentation, and/or cooling fans, 480 volt 60 hertz AC or 400 volt 50 hertz AC power to HVAC, and/or 120 volt 60 hertz AC or 230 volt 50 hertz AC power for lighting and/or courtesy outlets.

Mating provisions 112 include electrical and mechanical coupling provisions that enable one or more power modules 104 and/or option modules 106 to be electrically and mechanically coupled to back plane 102. The electrical coupling provisions may be, for example, a terminal connector or a terminal block, and the mechanical coupling provisions may be, for example, mounting holes or a DIN rail connector. In some embodiments, each of mating provisions 112 are functionally alike. In other words, a power module 104 or option module 106 configured to mechanically and electrically couple to one mating provision 112 can be coupled to any mating provision 112 of back plane 102. When coupled, back plane 102 provides power, such as, for example, 480 volt 60 hertz AC or 400 volt 50 hertz AC power to power modules 104 and option modules 106 via mating provisions 112. In some embodiments, power modules 104 provide 24 volt DC power and option modules 106 provide 120 volt AC power to multiple mating provisions 112. In certain embodiments, some of power modules 104 and/or option modules 106 are configured to couple to multiple mating provisions 112, for example, to provide increased power capacity to the power module 104 or option module 106 or to provide a backup in case one of the power connections between back plane 102 and power module 104 or option module 106 fails or in case one of the power modules 104 or option modules 106 fails.

Each power module 104 includes at least one connection provision 114 configured to mechanically and electrically couple with a respective mating provision 112 of back plane 102, through which power module 104 is configured to receive power, such as, for example, 480 volt 60 hertz AC or 400 volt 50 hertz AC power, from back plane 102. Power modules 104 are configured to provide power to auxiliary components of a system, such as, for example, 24 volt DC power to battery switchgear, controls, instrumentation, and/or cooling fans. Power modules 104 that are configured for greater power or current loads may include multiple connection provisions 114 to facilitate parallel electrical connections to back plane 102. In some embodiments, power modules 104 include an OR-ing/blocking diode 116 for protecting power modules 104 and components powered through power modules 104, and for selecting particular power modules 104 that are set to slightly higher or slightly lower voltages.

Like power modules 104, each option module 106 includes at least one connection provision 114 configured to mechanically and electrically couple with a respective mating provision 112 of back plane 102, through which option module 106 is configured to receive power such as, for example 24 volt DC power. Option modules 106 further include incorporated option components 118. Option components 118 include auxiliary components such as, for example, emergency stop systems, fire suppression systems, circuit breakers with shunt trips or auxiliary contacts, UPS, and/or other components. Option modules 106 including option components 118 that have greater power or current requirements may include multiple connection provisions 114 to facilitate parallel electrical connections to back plane 102.

Accordingly, back plane 102 is able to be quickly configured with appropriate power modules 104 and option modules 106 to provide auxiliary power to battery energy storage systems of various sizes. For example, a relatively small battery energy storage system that requires 3,000 watts of 24 volt DC power may use two 1,920 watt 24 volt DC power modules 104, while a relatively large battery energy storage system that requires 30,000 watts of 24 volt DC power may use sixteen 1,920 watt 24 volt DC power modules 104, with option modules 106 being added as required.

Figure 2:
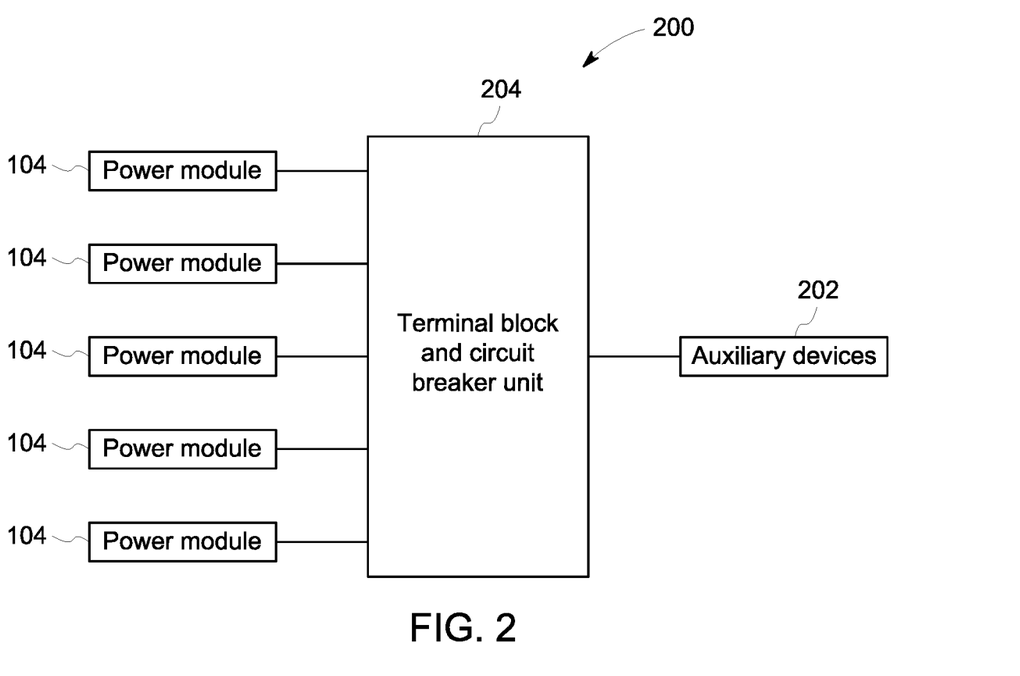
FIG. 2 is a block diagram of an example circuit architecture for providing power to components of a battery energy storage system.

FIG. 2 is a block diagram of an example circuit architecture 200 for providing power to components of a battery energy storage system such as auxiliary devices 202. Auxiliary devices 202 may include, for example, battery switchgear, fans, UPS, or other auxiliary components. Power modules 104, which may receive power from back plane 102 (shown in FIG. 1), are coupled to a terminal block and circuit breaker unit 204, and are configured to provide power to auxiliary devices 202 via terminal block and circuit breaker unit 204. While five power modules 104 are depicted in FIG. 2, any appropriate number of power modules 104 may be used. The number of power modules 104 may be selected based on the power requirements of auxiliary devices 202.

Figure 3:
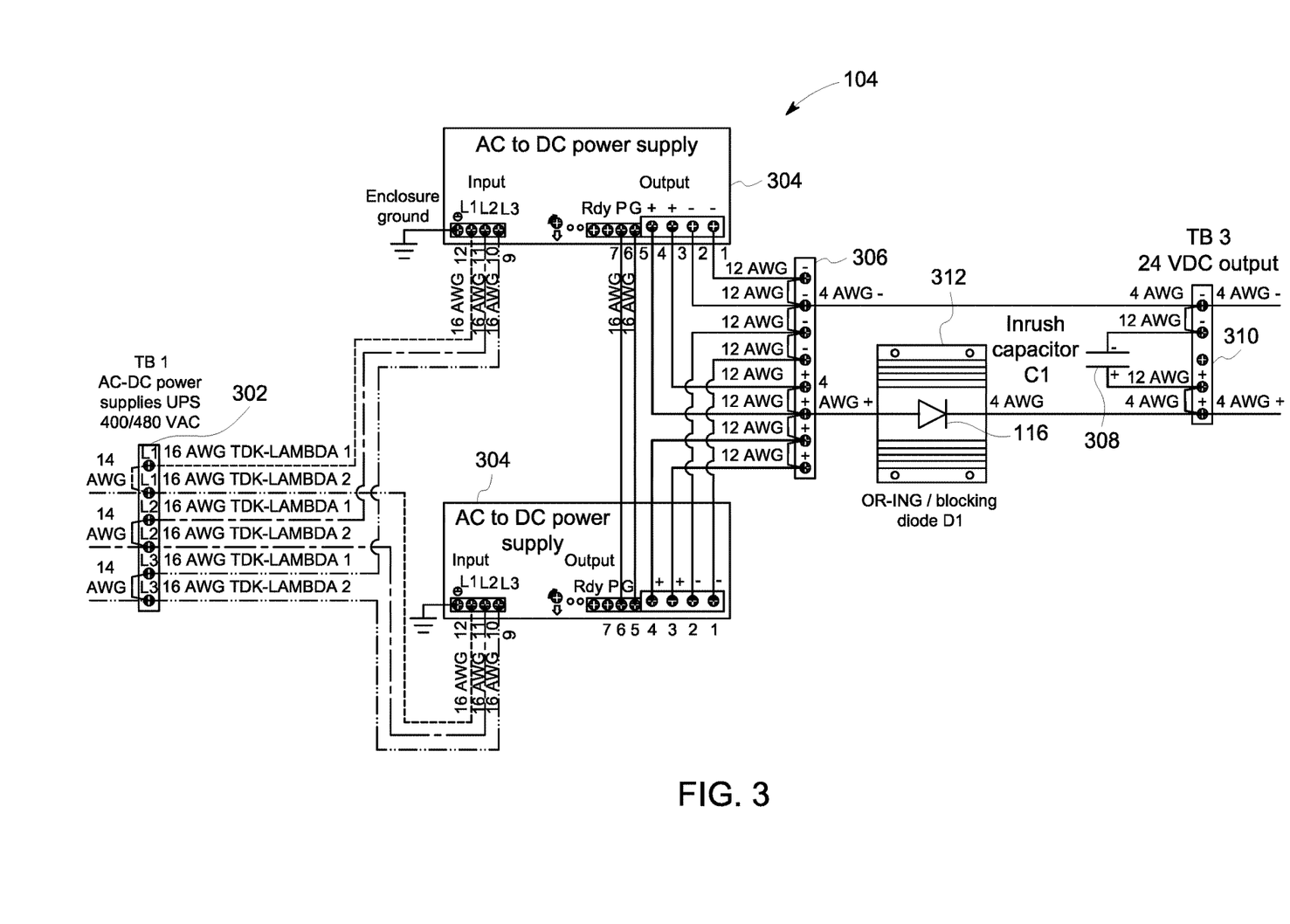
FIG. 3 is a schematic of an example power module for use with the system shown in FIG. 1 and the circuit architecture shown in FIG. 2.

FIG. 3 is a schematic of an example power module 104. Power module 104 includes an input terminal block 302, AC to DC power supplies 304, a reference terminal block 306, OR-ing/blocking diode 116, an inrush capacitor 308, and an output terminal block 310. Input terminal block 302 includes three phases, through which power module 104 receives power, such as three phase 480 volt or 400 volt AC power, from back plane 102. AC to DC power supplies 304 are coupled to input terminal block 302 and convert the power received from back plane 102 to output DC power, such as 24 volt DC power. AC to DC power supplies 304 are further coupled, in parallel, to reference terminal block 306. Reference terminal block 306 is in turn coupled to output terminal block 310 via OR-ing/blocking diode 116. In some embodiments, OR-ing/blocking diode 116 is positioned on a heat sink 312 to regulate a temperature of OR-ing/blocking diode 116. Power module 104 may supply power to components such as auxiliary devices 202 via output terminal block 310. Inrush capacitor 308 is coupled in shunt at output terminal block 310 and provides inrush current.

Figure 4:
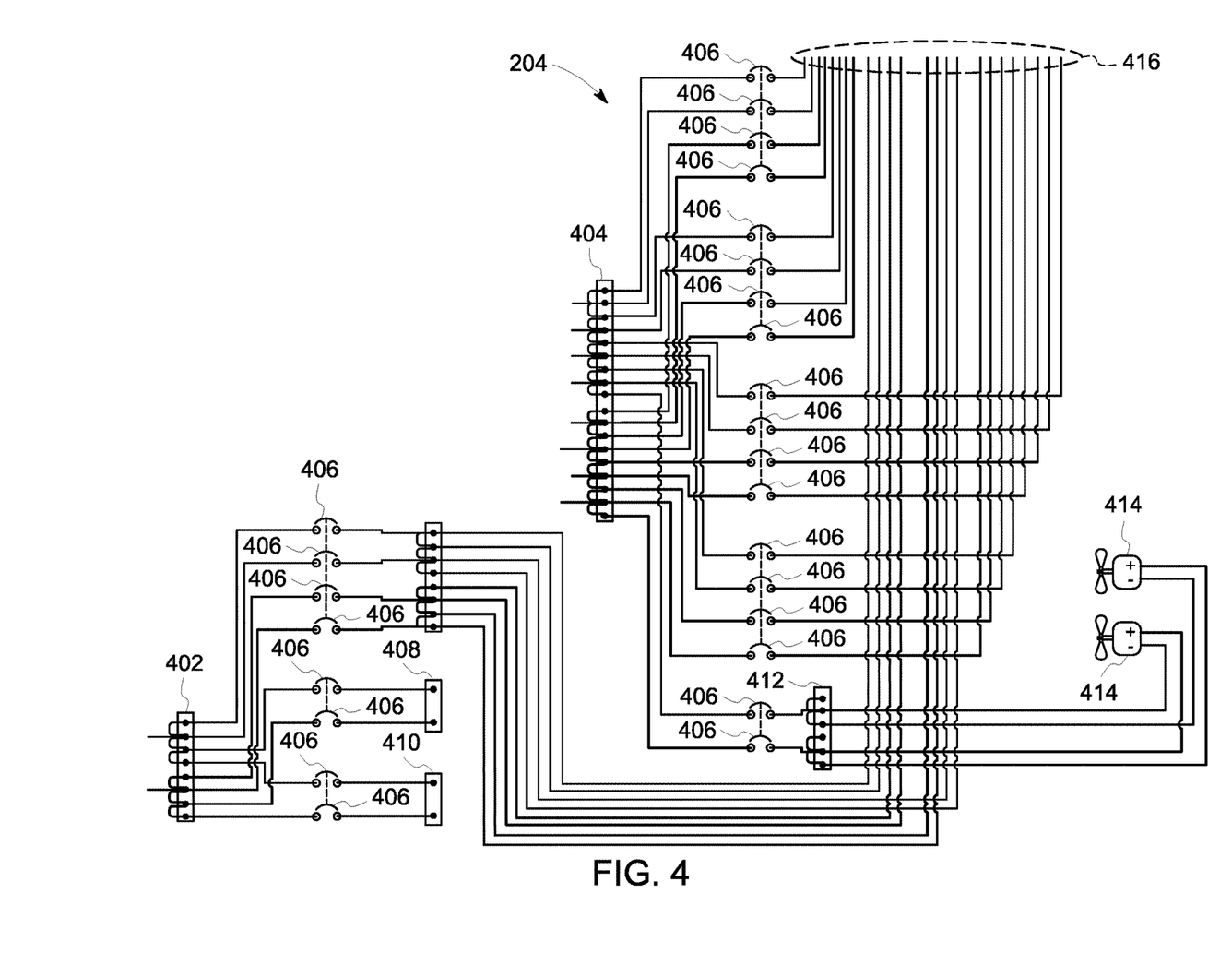
FIG. 4 is a schematic of an example terminal block and circuit breaker unit for use with the circuit architecture shown in FIG. 2.

FIG. 4 is a schematic of an example terminal block and circuit breaker unit 204. Terminal block and circuit breaker unit 204 includes a battery management system (BMS) and contactor power terminal block 402, a battery fan power terminal block 404, a plurality of circuit breakers 406, an emergency stop power terminal block 408, a UPS terminal block 410, a fans terminal block 412, and fans 414. BMS and contactor power terminal block 402 and battery fan power terminal block 404 are configured to be coupled to one or more respective power modules 104 to receive power, such as 24 volt DC power, from power modules 104. Circuit breakers 406 are coupled between the BMS and contactor power terminal block 402 and battery fan power terminal block 404 and the various loads powered via terminal block and circuit breaker unit 204 to protect these loads from excessive currents. Emergency stop power terminal block 408 and UPS terminal block 410 are configured to be coupled to, and provide power to, an emergency stop and UPS, respectively. Fans terminal block 412 is coupled to and configured to provide power to fans 414, which may be configured to cool power modules 104 and other components and equipment. Various circuit breakers 406 are also coupled to auxiliary devices 202 (shown in FIG. 2), such as battery fans and battery switchgear through additional electrical connections 416. In certain embodiments, these additional electrical connections 416 include additional terminal blocks or other coupling mechanisms.

Figure 5:
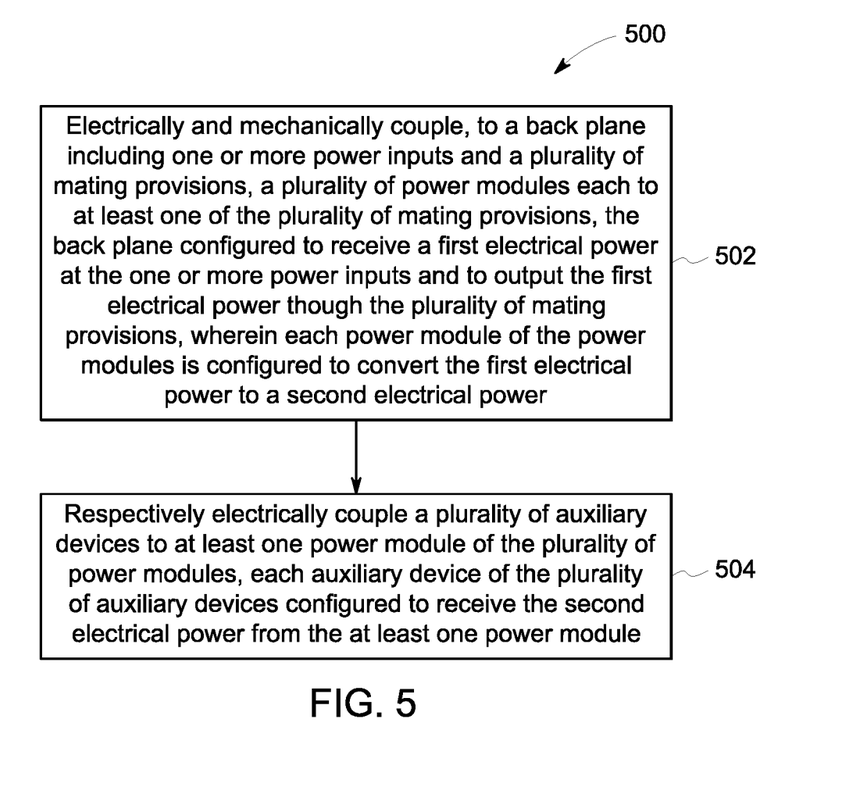
FIG. 5 is a flowchart of an example method for assembling an auxiliary power distribution system.

FIG. 5 is a flowchart illustrating an example method 500 for assembling a power distribution system such as power distribution system 100 (shown in FIG. 1).

Method 500 includes electrically and mechanically coupling 502, to a back plane (such as back plane 102) including one or more power inputs (such as input connection 108) and a plurality of mating provisions (such as mating provisions 112), a plurality of power modules (such as power modules 104) each to at least one of the plurality of mating provisions. The back plane is configured to receive a first electrical power at the one or more power inputs and to output the first electrical power though the plurality of mating provisions, and each power module of the plurality of power modules is configured to convert the first electrical power to a second electrical power. In some embodiments, the first electrical power is 480 volt 60 hertz three-phase AC power or 400 volt 50 hertz 3 phase AC power, and the second electrical power is 24 volt DC power. In certain embodiments, the power modules include components such as AC to DC power supplies (such as AC to DC power supplies 304), an AC to DC power supply, a DC-to-DC converter, a DC-to-AC inverter, an AC-to-AC transformer, and/or an OR-ing/blocking diode (such as OR-ing/blocking diode 116).

Method 500 further includes respectively electrically coupling 504 a plurality of auxiliary devices (such as auxiliary devices 202) to at least one of the plurality of power modules. Each auxiliary device of the plurality of auxiliary devices is configured to receive the second electrical power from the power modules. In some embodiments, the plurality of auxiliary devices includes battery switchgear, battery controls, battery instrumentation, and/or cooling fans. In certain embodiments, at least some of the plurality of auxiliary devices are mechanically coupled to the back plane.

In certain embodiments, method 500 further includes electrically coupling at least one option module (such as option module 106) to the back plane at one of the plurality of mating provisions. The at least one option module includes an incorporated option device and is configured to provide the first electrical power to the incorporated option device. In some such embodiments, the incorporated option device includes an emergency stop system, a fire suppression system, a circuit breaker, and/or a UPS.

In some embodiments, method 500 further includes electrically coupling at least one load to at least one power output (such as output connection 110) of the back plane. The back plane is further configured to convert the first electrical power to a third electrical power to provide the third electrical power to the at least one load. In some such embodiments, the at least one load includes battery switchgear, battery controls, battery instrumentation, cooling fans, and/or heating ventilating and air conditioning (HVAC).

In certain embodiments, method 500 further includes electrically coupling at least one auxiliary device of the plurality of auxiliary devices to at least two of the plurality of power modules. The at least one auxiliary devices receives the second electrical power from the at least two of the plurality of power modules.

An example technical effect of the methods, systems, and apparatus described herein includes at least one of: (a) providing electrical power to auxiliary components of a battery energy storage system using a plurality of power modules electrically and mechanically coupled to a back plane that convert a first power received from the back plane to a second power to provide to the auxiliary component; and (b) an ability to configure an auxiliary power distribution system for a particular battery energy storage system utilizing power modules that may be electrically and mechanically coupled to a standard back plane using standardized electrical and mechanical mating provisions.

Example embodiments of an auxiliary power system are provided herein. The systems and methods are not limited to the specific embodiments described herein, but rather, components of systems and/or steps of the methods may be utilized independently and separately from other components and/or steps described herein. For example, the methods may also be used in combination with other electronic systems, and are not limited to practice with only the electronic systems, and methods as described herein. Rather, the example embodiments can be implemented and utilized in connection with many other electronic systems.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic controller (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above embodiments are examples only, and thus are not intended to limit in any way the definition and/or meaning of the term processor and processing device.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An auxiliary power system comprising:
a back plane comprising one or more power inputs and a plurality of mating provisions, said back plane configured to receive a first electrical power at said one or more power inputs and output the first electrical power through said plurality of mating provisions;
a plurality of power modules, each power module of said plurality of power modules electrically coupled to and mechanically coupled to said back plane at one of said plurality of mating provisions, wherein each power module of said plurality of power modules is configured to convert the first electrical power to a second electrical power; and
a plurality of auxiliary devices, each auxiliary device of said plurality of auxiliary devices respectively electrically coupled to at least one power module of said plurality of power modules via a terminal block separate from the back plane and configured to receive the second electrical power from said at least one power module, wherein at least one auxiliary device of said plurality of auxiliary devices is electrically coupled to and receives the second electrical power from at least two of said plurality of power modules.

2. The auxiliary power system of claim 1, further comprising at least one option module, said at least one option module electrically coupled to and mechanically coupled to said back plane at one of said plurality of mating provisions, wherein said at least one option module comprises an incorporated option device and is configured to provide the first electrical power to said incorporated option device.

3. The auxiliary power system of claim 2, wherein said incorporated option device comprises at least one of an emergency stop system, a fire suppression system, a circuit breaker, and/or an uninterruptable power supply (UPS).

4. The auxiliary power system of claim 1, wherein each of said plurality of auxiliary devices comprises at least one of battery switchgear, battery controls, battery instrumentation, and/or cooling fans.

5. The auxiliary power system of claim 1, wherein said plurality of auxiliary devices are mechanically coupled to said back plane.

6. The auxiliary power system of claim 1, wherein said plurality of auxiliary devices mechanically coupled to said back plane comprises at least one of battery switchgear, battery controls, battery instrumentation, cooling fans, and/or heating ventilating and air conditioning (HVAC).

7. The auxiliary power system of claim 1, wherein the first electrical power is one of 480 volt 60 hertz three-phase AC power or 400 volt 50 hertz 3 phase AC power.

8. The auxiliary power system of claim 1, wherein the second electrical power is 24 volt DC power.

9. The auxiliary power system of claim 1, wherein each power module of said plurality of power modules comprises an OR-ing and/or blocking diode.

10. The auxiliary power system of claim 1, wherein each power module of said plurality of power modules comprises at least one of an AC to DC power supply, a DC-to-DC converter, a DC-to-AC inverter, and/or an AC-to-AC transformer.

11. A method for assembling an auxiliary power system, said method comprising:
electrically and mechanically coupling, to a back plane including one or more power inputs and a plurality of mating provisions, a plurality of power modules each to at least one of the plurality of mating provisions, the back plane configured to receive a first electrical power at the one or more power inputs and to output the first electrical power though the plurality of mating provisions, wherein each power module of the plurality of power modules is configured to convert the first electrical power to a second electrical power; and
respectively electrically coupling a plurality of auxiliary devices to at least one power module of the plurality of power modules via a terminal block separate from the back plane, each auxiliary device of the plurality of auxiliary devices configured to receive the second electrical power from the at least one power module, wherein at least one auxiliary device of the plurality of auxiliary devices is electrically coupled to and receives the second electrical power from at least two of the plurality of power modules.

12. The method of claim 11, further comprising electrically and mechanically coupling at least one option module to the back plane at one of the plurality of mating provisions, wherein the at least one option module includes an incorporated option device and is configured to provide the first electrical power to the incorporated option device.

13. The method of claim 11, further comprising mechanically coupling the plurality of auxiliary devices to the back plane.

14. An auxiliary power distribution system comprising:
a back plane comprising one or more power inputs and a plurality of mating provisions, said back plane configured to receive a first electrical power at said one or more power inputs and output the first electrical power through said plurality of mating provisions; and
a plurality of power modules, each power module of said plurality of power modules electrically coupled to and mechanically coupled to said back plane at one of said plurality of mating provisions, wherein each power module of said plurality of power modules is configured to convert the first electrical power to a second electrical power, wherein a plurality of auxiliary devices are respectively electrically coupled to at least one power module of said plurality of power modules via a terminal block separate from the back plane and configured to receive the second electrical power from said at least one power module, and wherein at least one auxiliary device of the plurality of auxiliary devices is electrically coupled to and receives the second electrical power from at least two of said plurality of power modules.

15. The auxiliary power distribution system of claim 14, further comprising at least one option module, said at least one option module electrically coupled to and mechanically coupled to said back plane at one of said plurality of mating provisions, wherein said at least one option module comprises an incorporated option device and is configured to provide the first electrical power to said incorporated option device.

16. The auxiliary power distribution system of claim 14, wherein the plurality of auxiliary devices are mechanically coupled to said back plane.

17. The auxiliary power distribution system of claim 14, wherein the first electrical power is one of 480 volt 60 hertz three-phase AC power or 400 volt 50 hertz 3 phase AC power.

18. The auxiliary power distribution system of claim 14, wherein the second electrical power is 24 volt DC power.

* * * * *